United States Patent Office 3,083,341
Patented Mar. 26, 1963

3,083,341
METHOD AND APPARATUS OF CONTROLLING GAIN OF AN AMPLIFIER
Gale White, Houston, and Edmond D. Jackson, Dallas, Tex., assignors to Texas Instruments Incorporated, Dallas, Tex., a corporation of Delaware
Continuation of application Ser. No. 423,697, Apr. 16, 1954. This application June 9, 1958, Ser. No. 743,516
24 Claims. (Cl. 330—132)

This invention relates to methods of controlling gain and more particularly to methods of controlling the gain of seismic signal amplifiers whereby the desired type of gain is obtained by modifying the operation of the automatic gain control section of the amplifier and is a continuation of application S.N. 423,697, filed April 16, 1954, now abandoned.

Generally speaking, a seismic amplifier equipped with automatic gain control is more satisfactory than either the fixed gain or the time varied gain amplifiers due to the nature of the energy received in the seismic surveying process. When an explosive charge is detonated, a portion of the waves generated travel in a more or less direct path from the charge to the seismometers while another portion of the waves travel into the earth and are reflected back to the seismometers from layers where a change of velocity occurs. At the interface between the layers of different velocity material, only a portion of the wave energy is reflected back to the surface while the remainder travels on towards deeper layers. These waves are attenuated in traveling from the shot point to the reflecting layer and from the reflecting layer to the seismometer and, of course, the energy reaching the seismometers becomes smaller as the reflections arrive from the deeper strata. Conversely, those waves traveling directly from the shot point to the seismometer result in a comparatively large signal. Even though these latter waves travel in the unconsolidated earth layer and consequently lower velocity layer, they generally arrive slightly before the reflections from the various strata because of the shorter travel path. Thus, the seismometers first receive energy at a high level which then decays rapidly as the reflections arrive from the deeper strata. The disproportion in magnitude between the waves traveling in the unconsolidated earth layer or from shallow horizons to the seismometers and those reflecting from the deeper horizons makes the use of a fixed gain amplifier unsuitable for the basic reason that any gain low enough to allow the largest signals to be recorded on a chart of reasonable width would be insufficient to distinguish reflections at the tail end of the record. Also, an amplifier system with its gain fixed as a function of time is not always satisfactory for the reason that the signals from underlying strata may decay in accordance with a different time function from that time function preset on the amplifier to increase the gain. Consequently, an automatic gain control system is usually provided in making seismic surveys to give the amplifiers a high gain for small signals and a low gain for large signals.

The feature of high gain with low amplitude input signals, however, presents a problem since the seismic amplifiers are placed in operation before the explosive charge is detonated and before any waves generated by the explosion arrive at the seismometers. Thus, any low amplitude random noises detected by the seismometers appear at the amplifiers and because of the automatic gain control action, increases the sensitivity of the amplifiers to a high gain level. Under these circumstances, when the high level first break energy from the seismic explosion arrives at the seismometers, the amplifiers become saturated and may not recover sufficiently to amplify the reflections containing useful seismic information. Another factor is that with all channel amplifiers in the system controlled by an automatic gain control, the signals received from seismometer to seismometer across the spread will be recorded as constant amplitude traces on the seismogram. This is not always desirable since the difference in the signal level received at the various seismometers is sometimes of assistance in interpreting the records. Also, for making velocity measurements in well bore-holes, a fixed gain amplifier is a prerequisite for the equipment used by those performing such surveys. Thus, amplifier systems equipped only with automatic gain control cannot meet the demands of systems requiring fixed gain amplification. Further, time varied gain is useful in areas where the signal decay function with time is known and can therefore be used in recording constant amplitude traces.

It is accordingly a primary object of this invention to provide seismic amplifiers with an initial control to decrease the sensitivity of the automatic gain control, and consequently the gain, until the seismic signals are received at the amplifier and cut off this initial control.

It is another object of this invention to provide means in conjunction with the automatic gain control to convert the automatically controlled gain amplifier to a fixed gain amplifier.

It is another primary object of this invention to provide a summing and averaging circuit whereby all channel amplifiers in the amplifying system are controlled from a master automatic gain control by the average signal level over the spread to obtain the variation in signal amplitude arriving at the various seismometers.

It is a still further object of this invention to provide a circuit with the ability to vary the gain of a number of amplifiers with time from a master oscillator.

These and other objects of the present invention will be apparent from the following description when taken in conjunction with the accompanying drawings in which.

Figure 1:
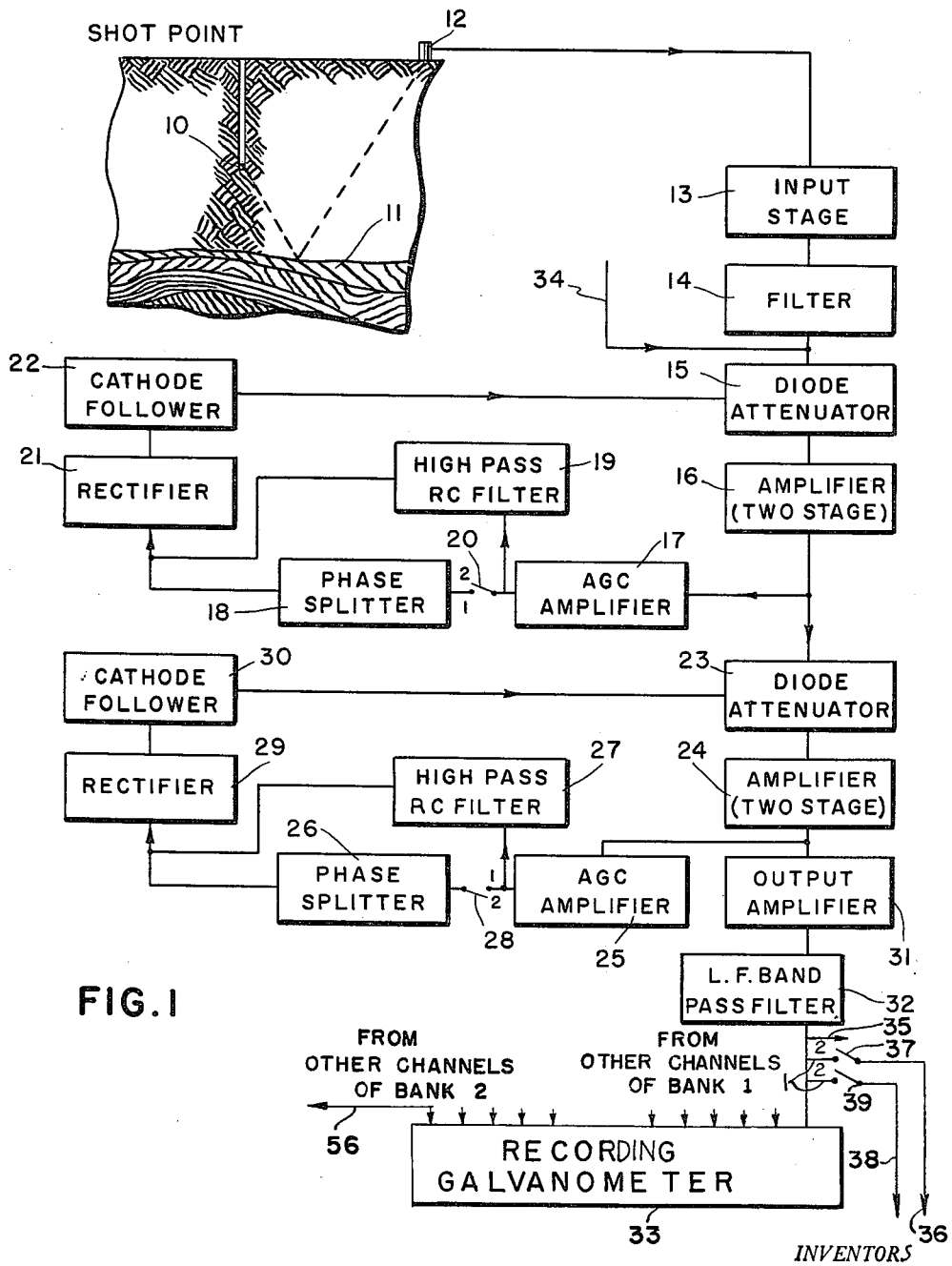
FIGURE 1 is a block diagram of a two loop automatic gain control seismic amplifier channel incorporating features for modifying the normal operation of the amplifier.

Describing briefly the circuit of FIGURE 1, a two loop automatic gain control amplifier channel is shown similar to that described in co-pending application Serial No. 423,671, filed April 16, 1954. When an explosive charge 10 is placed in a shot point drilled in the earth and fired, seismic waves are generated which travel into the earth to reflecting layer 11 where they are reflected (in part) back to a seismometer 12 disposed on the surface of the earth. The signals detected at seismometer 12 are fed to an input stage 13 comprised of any desired number of amplifier stages and then through filter 14. Filter 14 is designed to pass only certain frequencies within the seismic frequency band and therefore consists of filters with variable high cut-off and low cut-off characteristics to increase or decrease the frequency band passed as appears most advantageous. From there, the amplified and filtered signal is applied to diode attenuator 15 in the first AGC loop.

Diode attenuator 15, as described in the co-pending application referred to above, consists essentially of two diodes in series with a high resistance and an arrangement to control the bias voltage on the diodes. The plate of one diode is connected to the cathode of the other diode while the remaining cathode and plate of the diodes respectively are connected into a Wheatstone bridge. A positive source of D.-C. voltage is connected to the Wheatstone bridge to bias the cathodes of the diodes in the reverse direction for current flow and thereby create a very high resistance. This positive bias voltage applied to the diodes remains until a signal is fed through the AGC loop and converted into a positive D.-C. voltage to balance in whole or in part the constant bias voltage on the diode cathodes. The balance voltage to the Wheatstone bridge is provided by amplifying signals through amplifiers 16 and 17, feeding the amplified signals through phase splitter 18 to produce two voltages of opposite polarity, rectifying the voltages in rectifier 21, and then controlling the grid of cathode follower 22 by means of the rectified D.-C. voltage. The current flow in cathode follower 22 causes a voltage drop across a resistor in series with the cathode of the follower tube and determines the balance voltage applied to the bridge. Thus, as the balance voltage reduces the bias voltage on the diodes, the diodes offer less resistance to current flow. It follows then that since the two diodes are in series with a resistance, a voltage divider is formed in which the voltage drop across the resistance of the diodes varies in accordance with signal through the amplifier and which in turn provides the grid bias control for the amplifier in amplifier stage 16. More particularly, both diodes of the diode attenuator 15, together with their series resistance, form a voltage divider network in which the voltage drop across the diodes varies in accordance with the output signal of the amplifier 16 as impressed on the divider network through stages 17, 18, 19, 21 and 22. This varying voltage across the diodes of attenuator 15 is used as the grid bias or gain control of the amplifier 16. The effect of this circuit is to provide a constant amplitude output signal regardless of the amplitude of the input signal. This effect is multiplied by a second AGC loop identical to the first and consisting of the components designated by the numerals 23–30.

Figure 2:
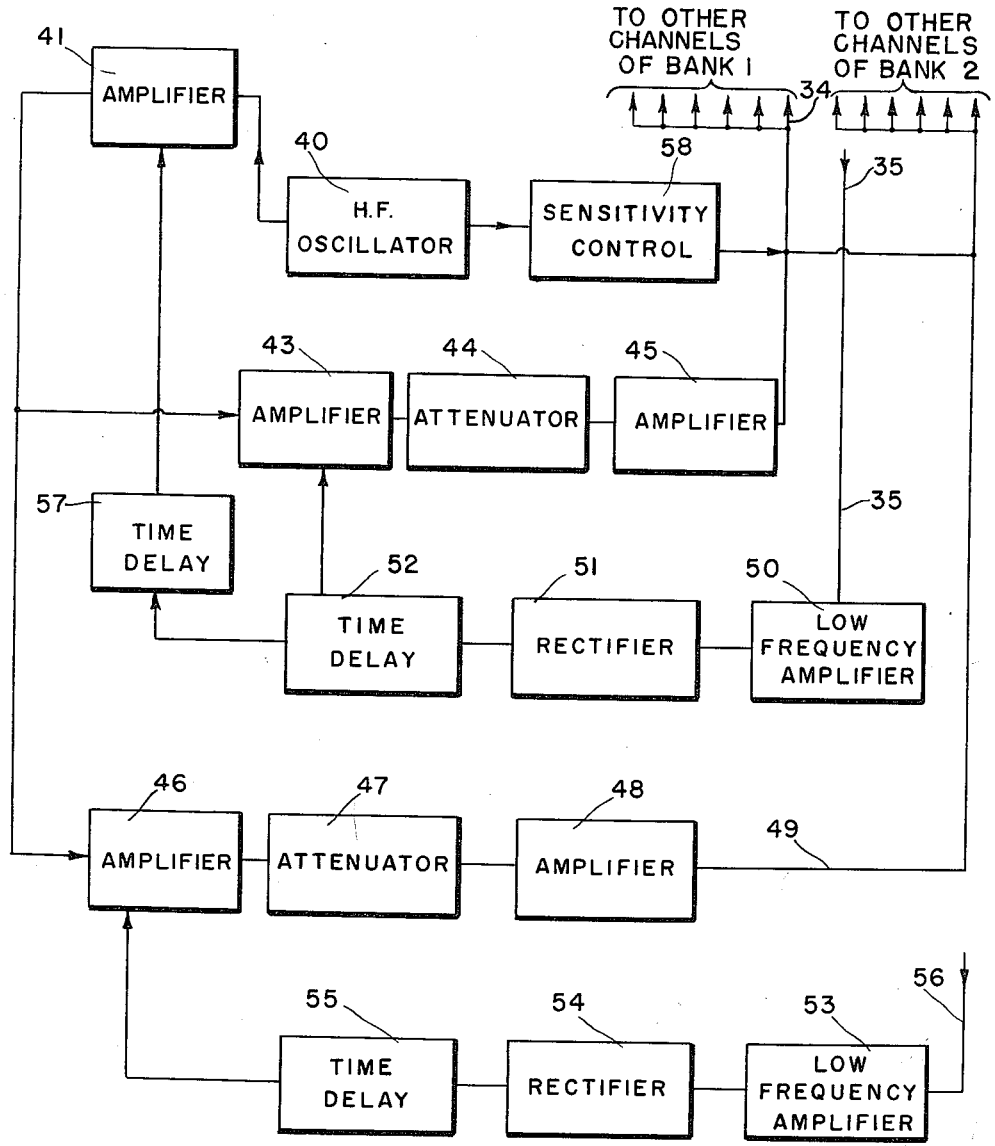
FIGURE 2 is a block diagram of the initial control circuit for decreasing the gain of the amplifier channel of FIGURE 1 until the first break energy is received.

Considering now FIGURES 1 and 2, the two circuits combined provide a means for initially controlling the sensitivity of the AGC loops to prevent saturation of the amplifiers when a large signal is received as well as to keep random noises from being recorded on the seismic record. The output of a high frequency oscillator 40, which is of considerably higher amplitude than the random noise signals detected by the seismometer, is amplified in amplifier 41 and then fed to amplifiers 43 and 46. The high frequency signal is first amplified in amplifier 43, and from there, it is reduced in amplitude in attenuator 44 and again amplified in amplifier 45 before being connected by lead 34 into the AGC amplifier loops as shown in FIGURE 1. In like manner, this amplified high frequency signal from oscillator 40 is connected into other amplifier channels as shown by the multiple leads in FIGURE 2.

The high frequency signal mixes with any low amplitude random noises detected by the seismometer and this mixed signal is amplified in amplifier 16. From amplifier 16, the mixed signal divides into two paths, one leading to amplifier 17 in the first AGC loop and the other to the second AGC loop. The action of the AGC loops being identical, only the action of the first loop on the mixed signal will be described here. After the signal is amplified by amplifier 17, the high frequency component passes through high pass RC filter 19 while the lower frequency random noise component passes through phase splitter 18, switch 20 being in the closed position. The signals again mix ahead of rectifier 21 and are there rectified and the D.-C. voltage applied to the grid of cathode follower 22. The voltage produced in the cathode follower is used to reduce the sensitivity of the AGC loop by decreasing the bias voltage on the diode attenuator 15 and therefore the grid bias voltage to amplifier stage 16. The same action occurs in the second loop of the AGC system. The low frequency band pass filter 32 at the output of the AGC loops blocks the high frequency signal from the recording galvanometer but, since the high frequency signal is much stronger than the random noise signal and has reduced the gain of the amplifier, the low amplitude random noise appears on the recording galvanometer as a straight line trace.

With the gain of the amplifier thus clamped down by the high frequency signal, the amplifier is not saturated by the initial high energy level seismic signals. Instead, these signals are amplified through the two loop AGC and recorded by the recording galvanometer 33 as a first break. Any signal recorded by galvanometer 33 also appears at lead 35 which is connected to low frequency amplifier 50. Since the signals passing filter 32 are within the seismic frequency band, they are of a low enough frequency to be accepted at amplifier 50 and are accordingly amplified. The output of the low frequency amplifier 50 is rectified by means of rectifier 51 to a negative D.-C. voltage and applied to the grid of amplifier 43 through a time delay circuit 52. The negative D.-C. voltage biases amplifier 43 to cut-off and thus removes the high frequency signal from the two AGC loops allowing the normal AGC operation to take hold and maintain the output of the seismic signals at a constant amplitude. It should be noted that although the high frequency signal is fed to a number of channels, there is only one return path to cut off the high frequency signal. The cut-off path is so chosen that the high frequency sensitivity reducing signal remains on all of the channels until the seismic signal has arrived at the farthest channel in time from the shot point. Further, a sensitivity control 58 is connected between oscillator 40 and the high frequency leads to the channels to prevent the gain control signal to each channel from falling below the preset level.

As indicated above, amplifier 41 feeds the signal from oscillator 40 to both amplifiers 43 and 46. A second bank of channel amplifiers is provided with initial gain control by feeding the high frequency signal from amplifier 41 to amplifier 46, attenuator 47, amplifier 48 and connecting the signal into the other channels by lead 49. A single lead cut-off path 56, similar to path 35, detects the low frequency signals at galvanometer 33 and applies these signals to a low frequency amplifier 53. The output of amplifier 53 is rectified by rectifier 54 to a negative D.-C. voltage and applied to the grid of amplifier 46 through a time delay circuit 55 to bias the amplifier to cut-off. By duplicating this arrangement, it is apparent that the sensitivity of any number of channels can be controlled by the high frequency signal from oscillator 40. Provision is made through a time delay circuit 57 to also bias amplifier 41 to cut-off.

To convert the amplifier channel from an automatically controlled gain amplifier to a fixed gain amplifier, switches 20 and 28 shown in FIGURE 1 are simply moved from switch position 1 to switch position 2. With the switches 20 and 28 in position 2, a path for the high frequency signal from oscillator 40 is provided through each AGC loop by the high pass RC filters 19 and 27 and, as before, this high frequency signal reduces the sensitivity of the control loops to prevent random noise signals from opening up the gain of the amplifiers and from appearing on the seismic record as a noisy trace. However, as low frequency signals (such as would be received from making velocity measurements in a borehole) are received at the channel, the open switches prevent the low frequency signals from completing a circuit through the phase splitters 18 and 26 and are therefore amplified straight through amplifiers 16 and 24 and output amplifier 31 to the recording galvanometer. The low frequency signal, picked up by lead 35, biases amplifier 43 to cut-off and removes the high frequency signal from the channel as described above. With the high frequency signal removed and the low frequency signal prevented from passing through the control loop, the channel operates merely as a fixed gain amplifier.

Figure 3:
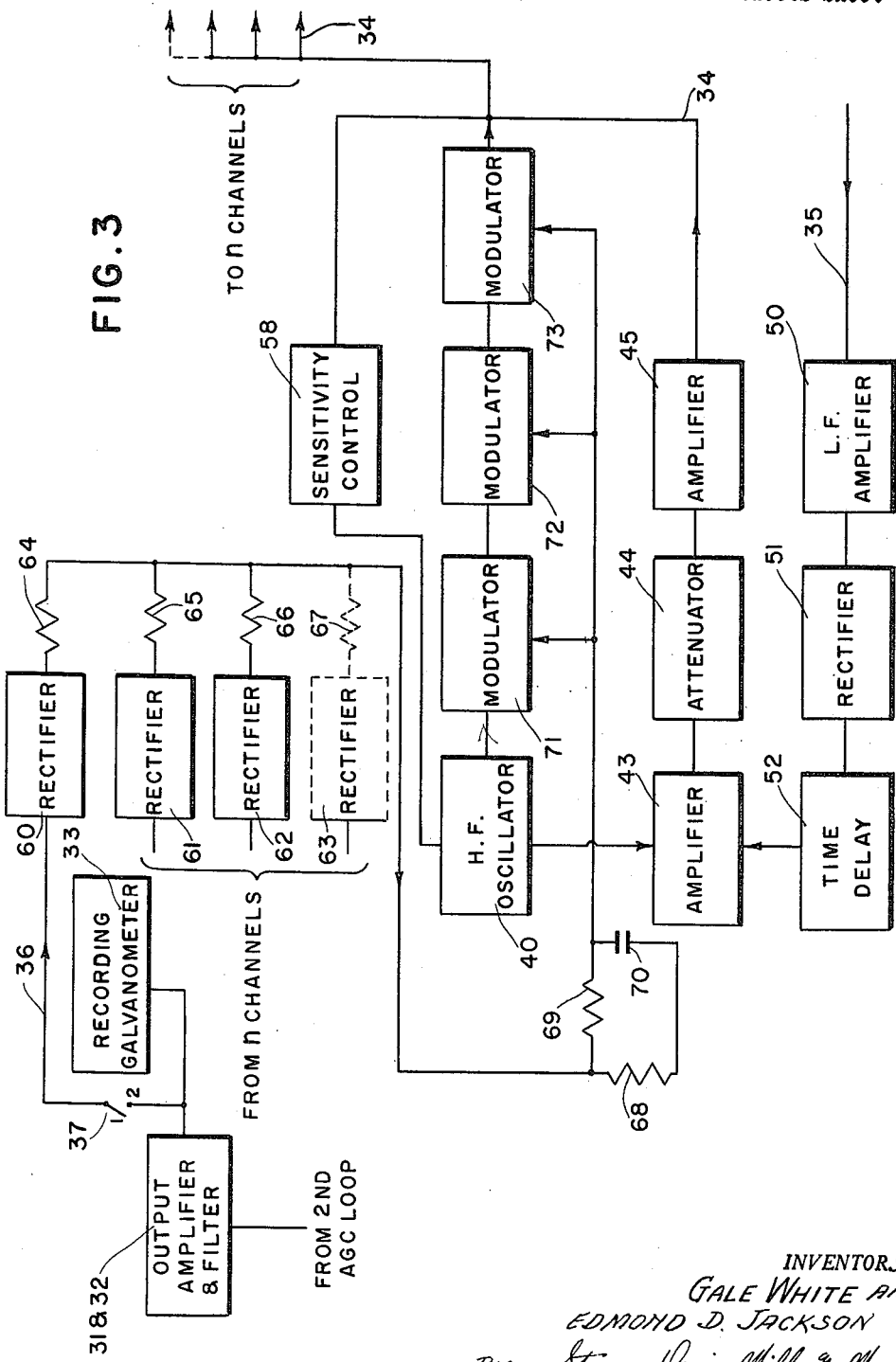
FIGURE 3 is a block diagram and partial schematic of a circuit for controlling the gain of a number of amplifiers by the average signal level received over the entire spread.

Considering now FIGURE 3 in conjunction with FIGURE 1, a circuit is provided for averaging the signals received at the seismometers across the spread and making all channels track from a master gain control. In this circuit, the gain of all channels is controlled by this average signal to give an indication of the variation in signal amplitude received at each seismometer. As in the circuit for fixed gain amplification, the high frequency signal from oscillator 40 is amplified in amplifier 43, reduced in amplitude by attenuator 44 and again amplified in amplifier 45 before being fed to the AGC loops by lead 34. Switches 20 and 28 are in switch position 2 thereby opening the circuit and preventing the low frequency signals from taking over the control of the AGC loops. The high pass RC filters 19 and 27 provide a path for the high frequency signals from oscillator 40 through the gain control loops to reduce the sensitivity of the channels. Low frequency seismic signals are then amplified straight through the channel and are picked up by lead 35 and routed to the low frequency amplifier 50. The output of amplifier 50 is rectified to a negative D.-C. voltage by rectifier 51 and fed through a time delay circuit 52 to the grid of amplifier 43 where the grid is biased to cut-off.

Switch 37, however, is now closed in switch position 2 and these same low frequency signals are picked up by lead 36. The low frequency signals are fed by lead 36 to a rectifier 60 where they are rectified to a positive D.-C. voltage. By a similar arrangement, low frequency signals from an $n$ number of channels are rectified to positive D.-C. voltages by rectifiers 61, 62 and 63. The rectified D.-C. voltages are summed and averaged in a circuit comprised of resistors 64, 65, 66 and 67 connected in parallel and the parallel resistances connected in series with a resistor 68 equal in resistance to the sum of the parallel resistances. Thus, a voltage divider is formed in which the D.-C. voltages are summed in the parallel resistances 64-67 and the average voltage level taken by the drop across resistor 68.

The ripple in the rectified D.-C. voltage across resistor 68 is smoothed out in condenser 70 and the voltage fed through resistor 69 to the grids of modulators 71, 72 and 73, modulators 71, 72 and 73 being connected in series with the output of oscillator 40. The positive voltage from the summing and averaging circuit drives the grids of the modulators more positive in accordance with the average amplitude of the low frequency signals and therefore controls the output of the oscillator. The modulated high frequency signal is connected with leads similar to lead 34 which then apply the control signals to an $n$ number of channels as indicated in FIGURE 3. High pass RC filters such as filters 19 and 27 of FIGURE 1 permit the high frequency control signal to pass through the control loops and, by varying the resistance of the diode attenuators, set the gain of each amplifier channel equal to every other channel. With the gain of all channels controlled by the average signal level over the entire spread, it can be seen that a larger signal detected at one seismometer will be recorded with a larger amplitude than a neighboring seismometer receiving a smaller signal. Therefore, the amplitude of the traces recorded side by side will not appear with the same amplitude but instead give an indication of the variation in signal level received at each seismometer in the spread.

Figure 4:
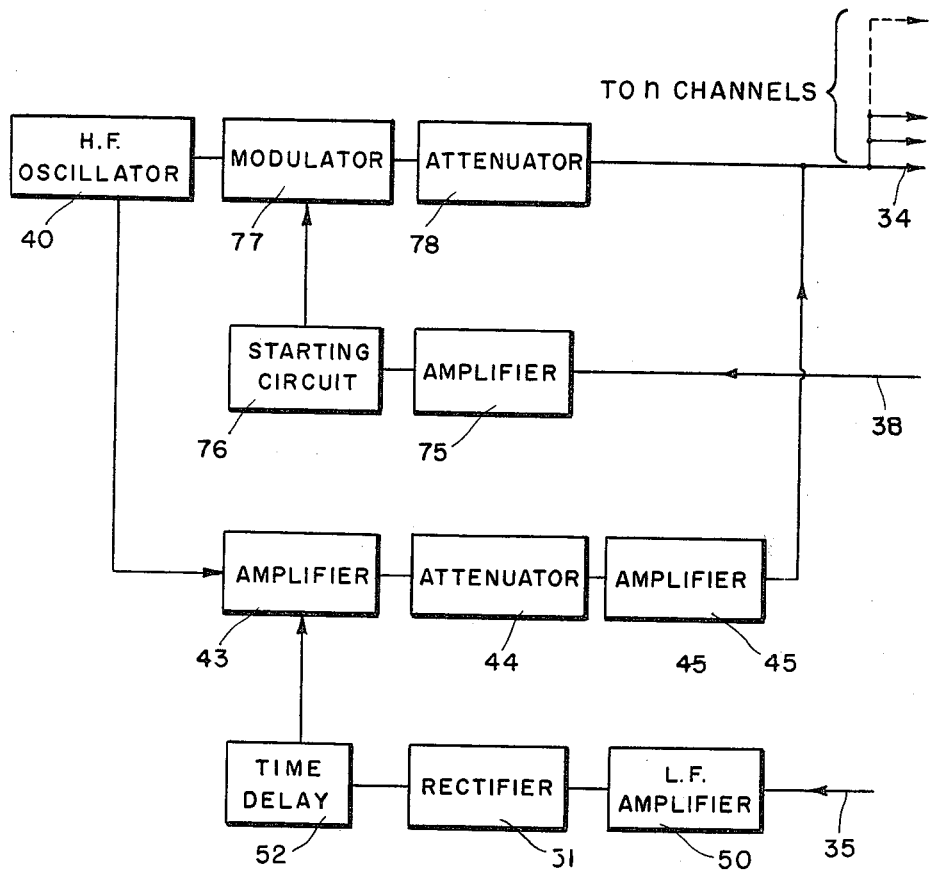
FIGURE 4 is a block diagram illustrating a circuit for converting an automatically controlled gain amplifier to a time varied gain amplifier.

FIGURE 4 in conjunction with FIGURE 1 illustrates a block diagram circuit for providing time varied gain for a seismic amplifier. As described in the other methods for controlling gain, the output of a high frequency oscillator 40 is fed through amplifier 43, attenuator 44 and amplifier 45 and applied to each channel in the amplifier system to reduce the gain of the channel and prevent random wind noises from appearing on the seismogram as a noisy trace. When a low frequency seismic signal is amplified through the channel, the high frequency signal is removed by a negative D.-C. voltage applied to the grid of amplifier 43 through lead 35, low frequency amplifier 50, rectifier 51 and a time delay circuit 52. To provide time varied gain control, switch 39 is closed to position 2 and this same low frequency signal fed to a low frequency amplifier 75 by lead 38. Amplifier 75 amplifies the signal and feeds it to a starting circuit 76. Starting circuit 76 consists of a rectifier to provide a positive voltage to the grid of an amplifier tube. A resistor is connected in series with the cathode of the amplifier tube to ground and a condenser is connected across the resistor. As current flows in the amplifier tube due to the rectified voltage, the voltage drop across the resistor charges the condenser. The discharge path of the condenser is connected to the grid of modulator 77, the modulator being connected in the output path of oscillator 40 and feeding into the AGC loops of an $n$ number of channels through attenuator 78 and leads similar to lead 34. When the condenser discharges, a large voltage is applied to the grid of modulator 77 which decreases in accordance with the discharge characteristic of the condenser. Thus, a large high frequency signal from oscillator 40 is applied to the AGC loops to decrease the gain for the first high energy level seismic waves and, as the discharge voltage of the condenser decreases, the high frequency control signal to the AGC loops decreases to allow a higher gain for the smaller seismic signals. If the time decay of seismic energy at a given prospect is known, the discharge characteristic of the condenser can be so chosen that the seismic signals will be recorded as a very nearly constant trace regardless of the signal amplitude.

To summarize a basic two loop automatic gain control seismic amplifier channel is provided with a high frequency signal and a high frequency path through the control loops together with means to switch the low frequency path out of the control loops. Then by using the low frequency seismic signal or the high frequency oscillator signal in various modifications, the gain of the amplifier can be controlled according to the desired type of gain.

Although the present invention has been shown and described in particular embodiments, nevertheless various changes and modifications obvious to one skilled in the art are within the spirit, scope and contemplation of the invention.

What is claimed is:

1. A gain control system for an amplifier comprising high frequency signal generating means, means to feed said high frequency signal to the input circuit of said amplifier, means to sample the high frequency components of the output signals of said amplifier, means to rectify said sample, means operative responsive to said rectified sample to control the degree of amplification of said amplifier means as an inverse function of the value of said rectified sample, and means operative responsive to frequency components of said output signals of said amplifier lower than the frequency of said high frequency signals to change the amplitude of said high frequency signals fed to the input of said amplifier.

2. A gain control system as defined in claim 1 wherein said means operative responsive to frequency components of said output signals of said amplifier lower than the frequency of said high frequency signals to change the amplitude of said high frequency signals changes the amplitude of said high frequency signals as a desired function of time.

3. A gain control system as defined in claim 1 wherein said means operative responsive to frequency components of said output signals of said amplifier lower than the frequency of said high frequency signals to change the amplitude of said high frequency signals reduces the amplitude of said high frequency signals by a fixed amount.

4. A signal amplifier having automatic gain control which comprises signal amplifying means having an input circuit, first means for deriving a first voltage proportional to the high frequency components of the output of said signal amplifying means, second means for deriving a second voltage proportional to the low frequency components of the output of said signal amplifying means, means for rectifying said first and second voltages, means operative responsive to said rectified voltages to control the gain of said signal amplifying means, means to generate a high frequency signal, means to feed said high frequency signal to the input circuit of said signal amplifying means, band pass filter means to receive the output from said signal amplifying means and pass only signals of a frequency lower than said high frequency signal, and means operative responsive to the output of said filter means to render inoperative said means to feed said high frequency signal to said input circuit of said signal amplifying means.

5. A signal amplifier having automatic gain control as defined in claim 4 wherein said first means and said second means for deriving first and second voltages proportional to the high and low frequency components of the output of said signal amplifying means are connected in parallel.

6. A signal amplifier having automatic gain control as defined in claim 5 wherein switch means is provided in series with said second means for deriving a second voltage proportional to the low frequency component of the output of said signal amplifying means.

7. An automatic gain control system for an amplifier which comprises space discharge amplifier means, means to sample the amplified signal, phase splitting means to transform said sampled signal into two voltages of opposite polarity, rectifying means to rectify said voltages, attenuating means operative responsive to said rectified voltage to control the degree of conductivity of said space discharge amplifier means, a high frequency pass filter in parallel with said phase splitting means, a high frequency signal generating means, means to feed said high frequency signal to said space discharge amplifier means, a low frequency pass filter to receive the output from said space discharge means amplifier, and feedback means to sample the output signal from said low frequency pass filter and to use same to block said high frequency signal.

8. An automatic gain control amplifier as defined in claim 7 wherein means are provided to amplify said high frequency signal before same is fed to said amplifier tube and said feedback means functions to bias said means to amplify high frequency signals to cut-off.

9. An automatic gain control amplifier as defined in claim 7 wherein switch means is provided in series with said phase splitting means.

10. An automatic gain control comprising an amplifier, a low frequency pass filter receiving the output of said amplifier, first sampling means to sample the output of said filter, a circuit including a condenser, means for charging said condenser by said sampled signal, high frequency generating means, means to modulate the generated high frequency signal by discharge of said condenser, means to feed said modulated high frequency signal to the input of said amplifier, second sampling means to sample the signal from the output of said amplifier, means to rectify said second sampled signal, and attenuating means operative responsive to said rectified second signal to control the grid bias of said amplifier.

11. An automatic gain control as defined in claim 10 wherein means are provided to feed a second high frequency signal unmodulated to said amplifier and means are provided to derive from the output of a low frequency pass filter a signal to block the unmodulated high frequency signal.

12. A gain control system for varying the gain of a plurality of amplifiers in unison and as a function of the average amplitude of the low frequency output signals of all of said plurality of amplifiers comprising means generating high frequency signals, means to feed said high frequency signals to the input of each of said plurality of amplifiers, means in each of said plurality of amplifiers to sample the high frequency output signals of that amplifier, means in each of said plurality of amplifiers to rectify said sample of said high frequency output signals, means in each of said plurality of amplifiers operative responsive to said rectified sample of said high frequency output signals to control the gain of that amplifier, means sampling the frequency components of the output signals of each of said plurality of amplifiers lower than the frequency of said high frequency signals, means averaging the amplitudes of said sampled frequency components of the output signals of all of said plurality of amplifiers, and means operative responsive to said means averaging the amplitudes of said frequency components to change the amplitude of said high frequency signals fed to the input of said plurality of amplifiers as an inverse function of said average amplitude of said frequency components.

13. An automatic gain control for a multi-channel amplifier system comprising a plurality of amplifiers, a low frequency pass filter receiving the output of each said amplifier, first sampling means to sample the output of each said filter, rectifying means to rectify each said sampled signal, means to sum and average said sampled signals from all said rectifiers, means to generate a high frequency signal, means to modulate said high frequency signal with said averaged signal, means to feed said modulated signal to the input of each said amplifier, second sampling means to sample the output signal from each said amplifier, means to rectify said second sampled signal, and attenuating means operative responsive to said second rectified signal to control the grid bias of said amplifier.

14. A master automatic gain control as defined in claim 13 wherein said means to sum and average said sampled signals includes a plurality of resistors in parallel and another resistor in series therewith equal in value to the sum of the values of said plurality of resistors.

15. A master automatic gain control as defined in claim 13 wherein means are provided to feed said high frequency signal unmodulated to each said amplifier, and means are provided to derive from the output of a low frequency pass filter a signal to block said unmodulated high frequency signal.

16. An automatic gain control as defined in claim 13 wherein a circuit composed of a phase splitting means and a switch means in series therewith arranged in parallel with a high frequency pass filter is interposed between said second sampling means and said means to rectify said second sampled signal.

17. The method of controlling as a desired function of time the gain of an amplifier having an automatic gain control circuit, which method comprises introducing into the amplifier at its input signals of a frequency higher than the highest frequency of the signals of interest to be amplified, blocking said signals of interest from said automatic gain control circuit, initiating attenuation of said high frequency signals in accordance with said desired function of time at about the time said signals of interest are applied to said amplifier.

18. The method of controlling as a desired function of time the gain of an amplifier having an automatic gain control circuit, which method comprises introducing into the amplifier at its input signals of a frequency higher than the highest frequency of signals of interest to be amplified, blocking said signals of interest from said automatic gain control circuit, adjusting the amplitude of said high frequency signals fed to the input of said amplifier to the value at which said automatic gain control circuit sets the gain of said amplifier at a desired initial level, and initiating attenuation of said high frequency signals in accordance with said desired function of time at about the time said signals of interest are applied to said amplifier.

19. The method of varying the gains of a plurality of amplifiers in unison and as a function of the average level of signals of interest at the outputs of all of said plurality of amplifiers, each of said amplifiers having a separate automatic gain control circuit and each receiving different signals of interest to be amplified, which method comprises introducing into all of said plurality of amplifiers at their inputs signals of a frequency higher than the highest frequency of said signals of interest, blocking said signals of interest from said automatic gain control circuits, sampling said signals of interest at the outputs of all of said plurality of amplifiers and thereafter controlling the amplitude of said high frequency signals as an inverse function of the average amplitude of said signals of interest sampled at the outputs of all of said plurality of amplifiers.

20. The method of varying the gains of a plurality of amplifiers in unison and as a function of the average level of signals of interest at the outputs of all of said plurality of amplifiers, each of said amplifiers having a separate automatic gain control circuit and each receiving different signals of interest to be amplified, which method comprises introducing into all of said plurality of amplifiers at their inputs signals of a frequency higher than the highest frequency of said signals of interest, blocking said signals of interest from said automatic gain control circuits, adjusting the amplitude of said high frequency signals to the value at which the automatic gain control circuits of each of said plurality of amplifiers set the gains of said plurality of amplifiers at a desired initial level, sampling said signals of interest at the outputs of all of said plurality of amplifiers and thereafter controlling the amplitude of said high frequency signals as an inverse function of the average amplitude of said signals of interest sampled at the outputs of all of said plurality of amplifiers.

21. The method of controlling the gain of an amplifier having an automatic gain control circuit in such manner as to provide a desired fixed value of gain in said amplifier before signals of interest to be amplified are applied to said amplifier and to provide a different desired fixed value of gain in said amplifier after said signals of interest are applied to said amplifier, which method comprises introducing into the amplifier at its input signals of a frequency higher than the highest frequency of said signals of interest to be amplified, blocking said signals of interest from said automatic gain control circuit and removing said high frequency signals from the input of said amplifier at about the time said signals of interest are applied to said amplifier.

22. The method of controlling the gain of an amplifier having an automatic gain control circuit in such manner as to provide a desired fixed initial value of gain in said amplifier before signals of interest are applied to said amplifier and to provide a different desired fixed value of gain in said amplifier after said signals of interest are applied to said amplifier, which method comprises introducing into the amplifier at its input signals of a frequency higher than the highest frequency of said signals of interest to be amplified, blocking said signals of interest from said automatic gain control circuit, adjusting the amplitude of said high frequency signals to the value at which said automatic gain control circuit sets the gain of said amplifier at said desired fixed initial value and thereafter removing said high frequency signals from the input of said amplifier at about the time said signals of interest are applied to said amplifier.

23. The method of controlling the gain of an amplifier having an automatic gain control circuit in such manner as to provide a desired fixed value of gain in said amplifier before signals of interest to be amplified are applied to said amplifier and to provide a different desired fixed value of gain in said amplifier after said signals of interest are applied to said amplifier, which method comprises introducing into said amplifier at its input signals of a frequency higher than the highest frequency of said signals of interest to be amplified, blocking said signals of interest from said automatic gain control circuit, and changing the amplitude of said high frequency signals at the input of said amplifier at about the time said signals of interest are applied to said amplifier.

24. The method of controlling the gain of an amplifier having an automatic gain control circuit in such manner as to provide a desired fixed initial value of gain in said amplifier before signals of interest to be amplified are applied to said amplifier and a different desired fixed value of gain in said amplifier after said signals of interest are applied to said amplifier, which method comprises introducing into said amplifier at its input signals of a frequency higher than the highest frequency of said signals of interest to be amplified, blocking said signals of interest from said automatic gain control circuit, adjusting the amplitude of said high frequency signals to the value at which said automatic gain control circuit sets the gain of said amplifier to said desired initial value, and thereafter changing the amplitude of said high frequency signals at the input of said amplifier at about the time said signals of interest are applied to said amplifier.

References Cited in the file of this patent

UNITED STATES PATENTS

| | | |
|---|---|---|
| 2,286,106 | Ritzmann | June 9, 1942 |
| 2,329,558 | Scherbatskoy | Sept. 14, 1943 |
| 2,397,830 | Bailey | Apr. 2, 1946 |
| 2,554,905 | Hawkins | May 29, 1951 |
| 2,663,002 | McManis | Dec. 15, 1953 |
| 2,723,387 | Slavin | Nov. 8, 1955 |